US 011506302B2

(12) United States Patent
Kamimaru

(10) Patent No.: US 11,506,302 B2
(45) Date of Patent: Nov. 22, 2022

(54) DISCHARGE VALVE UNIT AND FLUID DEVICE

(71) Applicant: TLV CO., LTD., Hyogo (JP)

(72) Inventor: Naoki Kamimaru, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 0 days.

(21) Appl. No.: 17/648,650

(22) Filed: Jan. 21, 2022

(65) Prior Publication Data
US 2022/0146013 A1 May 12, 2022

Related U.S. Application Data

(63) Continuation of application No. PCT/JP2020/021753, filed on Jun. 2, 2020.

(30) Foreign Application Priority Data

Aug. 8, 2019 (JP) .............................. JP2019-145917

(51) Int. Cl.
*F16K 31/20* (2006.01)
*F16T 1/12* (2006.01)

(52) U.S. Cl.
CPC ................ *F16K 31/20* (2013.01); *F16T 1/12* (2013.01)

(58) Field of Classification Search
CPC ............. F16T 1/12; F16K 31/18; F16K 31/20
USPC ......................... 137/177, 183, 184, 187, 192
See application file for complete search history.

(56) References Cited

U.S. PATENT DOCUMENTS

| 915,780 | A | * | 3/1909 | Malcolm | ................. | E03D 1/165 |
| | | | | | | 137/433 |
| 1,897,753 | A | * | 2/1933 | Cryer | ........................ | F16T 1/22 |
| | | | | | | 236/53 |
| 1,944,249 | A | * | 1/1934 | Lencke | ..................... | F16T 1/12 |
| | | | | | | 137/596.1 |

(Continued)

FOREIGN PATENT DOCUMENTS

| CN | 104412027 A | 3/2015 |
| CN | 108692176 A | 10/2018 |

(Continued)

OTHER PUBLICATIONS

International Search Report issued in PCT/JP2020/021753; dated Sep. 1, 2020.
An Office Action mailed by China National Intellectual Property Administration dated May 27, 2022, which corresponds to Chinese Patent Application No. 202080051770.2 and is related to U.S. Appl. No. 17/648,650.

*Primary Examiner* — Umashankar Venkatesan
(74) *Attorney, Agent, or Firm* — Studebaker & Brackett PC

(57) ABSTRACT

The discharge valve unit includes: a valve case configured to be detachably attached to the housing and including a second reservoir for liquid configured to communicate with the first reservoir when the valve case is attached to the housing; and a second valve mechanism disposed in the second reservoir and including a second discharge hole having a larger opening diameter than that of the first discharge hole and a second valve member accommodated in the second reservoir and configured to open and close the second discharge hole. The second valve mechanism includes a spring configured to bias the second valve member in a valve opening direction. When a pressure of the second reservoir increases to a predetermined value, the second valve member closes the second discharge hole against a biasing force of the spring.

8 Claims, 5 Drawing Sheets

(56) References Cited

U.S. PATENT DOCUMENTS

| | | | | |
|---|---|---|---|---|
| 2,117,056 | A * | 5/1938 | Dunn | F16T 1/24 |
| | | | | 137/329.04 |
| 3,489,164 | A * | 1/1970 | Katsuji | F16T 1/22 |
| | | | | 137/433 |
| 3,776,255 | A * | 12/1973 | Fujiwara | F16K 24/046 |
| | | | | 137/433 |
| 4,685,486 | A * | 8/1987 | Yokoyama | F16T 1/22 |
| | | | | 137/179 |
| 4,860,782 | A | 8/1989 | Fujiwara et al. | |
| 6,174,138 | B1 | 1/2001 | Stephens | |
| 8,230,872 | B2 * | 7/2012 | Pandurang | F16T 1/24 |
| | | | | 137/184 |
| 11,015,718 | B2 * | 5/2021 | Oike | F16K 31/22 |
| 2015/0192248 | A1 | 7/2015 | Oike | |

FOREIGN PATENT DOCUMENTS

| | | |
|---|---|---|
| JP | S52-55715 Y2 | 12/1977 |
| JP | S56-70192 A | 6/1981 |
| JP | H02-116071 U | 9/1990 |
| JP | H03-29678 Y2 | 6/1991 |
| JP | H04-18015 Y2 | 4/1992 |
| JP | H11-153295 A | 6/1999 |
| JP | 2007-218332 A | 8/2007 |
| JP | 2011-226505 A | 11/2011 |
| JP | 2012-225398 A | 11/2012 |

\* cited by examiner

DISCHARGE VALVE UNIT AND FLUID DEVICE

CROSS-REFERENCE TO RELATED APPLICATION

This is a continuation of PCT International Application PCT/JP2020/021753 filed on Jun. 2, 2020, which claims priority to Japanese Patent Application No. 2019-145917 filed on Aug. 8, 2019. The disclosures of these applications including the specifications, the drawings, and the claims are hereby incorporated by reference in their entirety.

FIELD

The present application relates to a discharge valve unit that discharges liquid and a fluid device equipped with the discharge valve unit.

BACKGROUND

One of known fluid devices is a drain trap that is provided in a steam system and configured to reduce emission of steam, while discharging drain. At the start of operation of the steam system, from the viewpoint of preventing a water hammer that can occur by mixing low-temperature drain remaining in the system with steam, a large amount of remaining drain needs to be discharged quickly by the drain trap.

In a drain trap disclosed in Japanese Patent Application Publication No. 2007-218332, for example, a reservoir includes two discharge holes with different sizes and two floats for opening and closes the discharge holes. In this drain trap, at the start of operation, drain is discharged from the lower discharge hole with a larger size. When the pressure increases and reaches a normal operating state, the lower discharge hole is closed by the float. In the lower discharge hole, even when drain is accumulated, the float does not rise and the lower discharge hole remains closed. This is because the size of the lower discharge hole is set such that a valve closing force of the float caused by a pressure difference between upstream and downstream sides of the discharge hole is larger than a valve opening force of the float caused by buoyancy. On the other hand, the upper discharge hole is opened and closed by floating up and down of the float in accordance with a storage level of drain.

SUMMARY

In the lower discharge hole having a larger size described above, however, even when the pressure decreases after operation is finished, the float might unintentionally adhere to the discharge hole to keep the discharge hole closed. This might hinder discharge of drain from the lower discharge hole at the start of next operation.

It is therefore an object of the technique disclosed here to provide a discharge valve unit having a liquid discharge discharge hole capable of opening at the start of operation and closing after the operation without fail, and a fluid device.

The technique disclosed here provides a discharge valve unit configured to be attached to a fluid device including a housing including an inlet and a first reservoir for liquid that has flowed from the inlet and a first valve mechanism including a first discharge hole for liquid provided in the first reservoir and a float accommodated in the first reservoir and configured to open and close the first discharge hole.

The discharge valve unit includes a valve case and a second valve mechanism. The valve case is configured to be detachably attached to the housing and includes a second reservoir for liquid configured to communicate with the first reservoir when the valve case is attached to the housing. The second valve mechanism is disposed in the second reservoir, and includes a second discharge hole for liquid having an opening diameter larger than an opening diameter of the first discharge hole, and a valve member accommodated in the second reservoir and configured to open and close the second discharge hole. The second valve mechanism includes a spring configured to bias the valve member in a valve opening direction, and when a pressure of the second reservoir increases to a predetermined value, the valve member closes the second discharge hole under the pressure against a biasing force of the spring.

Another technique disclosed in the present application is a fluid device including a housing, a first valve mechanism, and the discharge valve unit described above. The housing includes an inlet and a first reservoir for liquid that has flowed in the housing from the inlet. The first valve mechanism includes a first discharge hole for liquid provided in the first reservoir, and a float accommodated in the first reservoir and configured to open and close the first discharge hole. The discharge valve unit is attached to the housing.

The technique disclosed here can provide a discharge valve unit and a fluid device having a liquid discharge hole capable of opening at the start of operation and closing after the operation without fail.

DESCRIPTION OF EMBODIMENTS

Embodiments of the present application will be described hereinafter with reference to the drawings. The following embodiments are merely preferred examples in nature, and are not intended to limit techniques disclosed here, applications, and the range of use of the application.

First Embodiment

A first embodiment of the present application will be described with reference to FIGS. 1 through 4. A pressure reducing valve 100 according to this embodiment is provided in, for example, a steam system, reduces the pressure of inflow steam to a predetermined pressure, and supplies the resulting steam to a downstream side. The pressure reducing valve 100 is an example of a fluid device.

The pressure reducing valve 100 incorporates a separation mechanism 10 for separating drain included in inflow steam and a drainage mechanism 40 for discharging separated drain. That is, the pressure reducing valve 100 is a pressure reducing valve with a gas-liquid separation function and a drain trap function. The pressure reducing valve 100 is equipped with a discharge valve unit 50 constituting a part of the drainage mechanism 40. Drain and steam are examples of liquid and gas, respectively.

Figure 1:
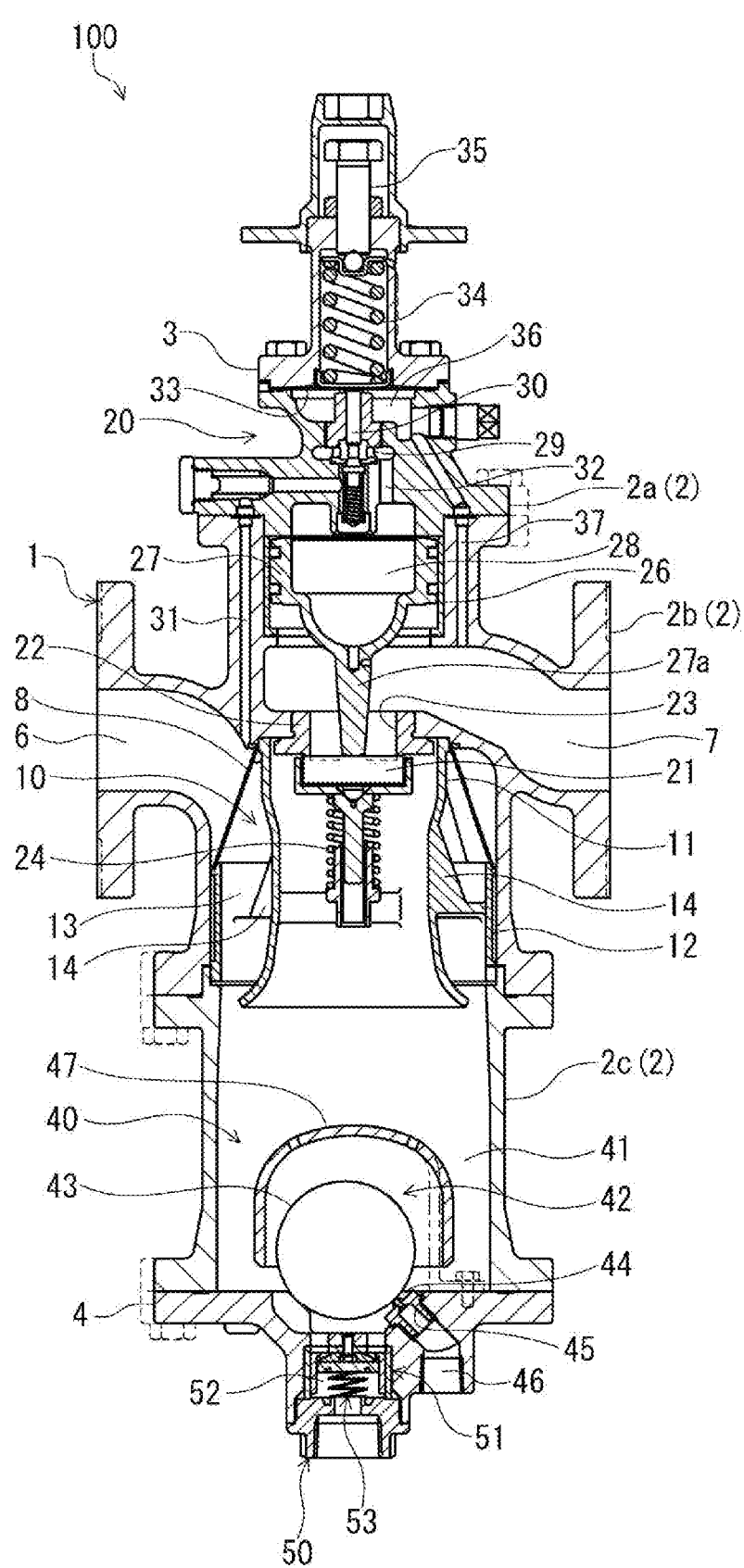
FIG. 1 is a cross-sectional view illustrating a schematic configuration of a pressure reducing valve according to a first embodiment.

As illustrated in FIG. 1, the pressure reducing valve 100 includes a housing 1 having a liquid channel, and the separation mechanism 10, a pressure reducing mechanism 20, and the drainage mechanism 40 that are incorporated in the housing 1.

The housing 1 includes a body 2 and a top lid 3 and a bottom lid 4 respectively attached to the top and bottom of the body 2. The body 2 is constituted by an upper part 2a, a middle part 2b, and a lower part 2c that are coupled to one another in the top-bottom direction. The housing 1 has an inlet 6 and an outlet 7 of steam. More specifically, the inlet 6 and the outlet 7 are part of the channel described above, and are provided in the middle part 2b. The inlet 6 and the outlet 7 are formed on the same axis that extends horizontally.

In the housing 1, the pressure reducing mechanism 20, the separation mechanism 10, and the drainage mechanism 40 are disposed in this order from the top. The separation mechanism 10 is substantially disposed in the middle part 2b, and communicates with the inlet 6. The pressure reducing mechanism 20 is substantially disposed across the top lid 3, the upper part 2a, and the middle part 2b, and communicates with the outlet 7. The drainage mechanism 40 is disposed across the lower part 2c and the bottom lid 4, and communicates with the inlet 6 through the separation mechanism 10.

That is, the housing 1 includes a channel through which steam that has flowed from the inlet 6 flows to the outlet 7 via the separation mechanism 10 and the pressure reducing mechanism 20 in this order, and also includes a channel through which drain that has flowed into the channel from the inlet 6 together with steam flows to the drainage mechanism 40 via the separation mechanism 10.

The separation mechanism 10 is a so-called cyclone separator, and separates drain included in steam that has flowed into the separation mechanism 10 from the inlet 6 as described above. The separation mechanism 10 includes an inner cylinder 11, an outer cylinder 12, and a turning blade 14.

Each of the inner cylinder 11 and the outer cylinder 12 has a cylindrical shape that extends upward and downward. The outer cylinder 12 has a diameter larger than that of the inner cylinder 11, and has a length smaller than that of the inner cylinder 11. The outer cylinder 12 is disposed at the outer periphery of the inner cylinder 11 with a spacing, and is coaxial with the inner cylinder 11. The outer cylinder 12 is located at a position corresponding to an approximately lower half of the inner cylinder 11. Each of the upper end and the lower end of the inner cylinder 11 is flared.

The turning blade 14 is provided in ring-shaped space 13 between the outer cylinder 12 and the inner cylinder 11. The turning blade 14 are integrated with the outer cylinder 12 and the inner cylinder 11. In the separation mechanism 10, an upper portion of the ring-shaped space 13 communicates with the inlet 6. That is, steam that has flowed from the inlet 6 flows in the ring-shaped space 13 from above. The separation mechanism 10 is provided with a conical screen 8 in an upper portion of the ring-shaped space 13. The screen 8 prevents foreign substance from flowing into the ring-shaped space 13 from the inlet 6.

Steam that has flowed into the separation mechanism 10 from the inlet 6 passes through the screen 8, flows in the ring-shaped space 13, and turns. By turning of the steam, drain (water drops) included in the steam is separated to the outer peripheral side. Steam from which drain has been separated flows into the inner cylinder 11 from the lower end, and flows to the pressure reducing mechanism 20. The separated drain flows down along the inner wall surface of the lower part 2c and flows to the drainage mechanism 40.

The pressure reducing mechanism 20 reduces the pressure of steam separated from drain by the separation mechanism 10 and keeps the steam at a constant pressure. The pressure reducing mechanism 20 includes a main valve member 21, a valve seat 22, a piston 27, a pilot valve chamber 29, a pilot valve member 30, a diaphragm 33, a spring 34, and an adjusting screw 35.

The valve seat 22 is provided at the upper end of the inner cylinder 11, and has a valve hole 23 that is open in the top-bottom direction. The valve hole 23 communicates with the outlet 7. The main valve member 21 is provided below (upstream of) the valve seat 22, and opens and closes the valve hole 23 when being seated on or released from the valve seat 22. The main valve member 21 is biased upward (in a valve closing direction) by the spring 24.

A tubular cylinder 26 extending upward and downward is provided above the main valve member 21, and a piston 27 that is slidable upward and downward is provided in the cylinder 26. The piston 27 has a shaft 27a projecting from the lower end of the cylinder 26 and extending downward. The lower end of the shaft 27a is inserted in the valve hole 23 and is in contact with the upper surface of the main valve member 21. In the cylinder 26, a piston chamber 28 is formed at an opposite side to the side of the piston 27 toward the main valve member 21.

The pilot valve chamber 29 is disposed above the cylinder 26 and the piston 27. The pilot valve chamber 29 communicates with the inlet 6 through a communication path 31, and communicates with the piston chamber 28 through a communication path 32. The pilot valve member 30 is a rod member extending upward and downward, and penetrates the pilot valve chamber 29 in the top-bottom direction. The pilot valve member 30 is displaced upward and downward to thereby switch the communication state of the communication path 31 and the communication path 32 between a communication state or a shut-off state.

The diaphragm 33 has a disc shape extending horizontally, and is disposed above the pilot valve member 30. The upper end of the pilot valve member 30 is in contact with a center portion of the lower surface of the diaphragm 33. A lower surface chamber 36 is formed at the lower surface of the diaphragm 33. The lower surface chamber 36 communicates with the outlet 7 through a communication path 37.

The spring 34 is provided at the upper surface of the diaphragm 33. The spring 34 biases the diaphragm 33 downward (toward the lower chamber 36). The adjusting screw 35 for adjusting a biasing force of the spring 34 is provided at the upper end of the spring 34. That is, when the adjusting screw 35 is displaced downward, the biasing force of the spring 34 increases, whereas when the adjusting screw 35 is displaced upward, the biasing force of the spring 34 decreases.

In the pressure reducing mechanism 20, when the pressure at the outlet 7 (i.e., a portion downstream of the valve hole 23) decreases below a predetermined value, the pressure of the lower surface chamber 36 decreases. Thus, the diaphragm 33 is displaced downward by the biasing force of the spring 34. When the diaphragm 33 is displaced downward, the pilot valve member 30 is thereby pushed downward and displaced. Accordingly, the communication path 31 and the communication path 32 communicate with each other, and a high pressure at the inlet 6 (i.e., a portion upstream of the valve hole 23) is exerted on the piston chamber 28.

Then, the high pressure of the piston chamber 28 causes the piston 27 to be displaced downward. This displacement of the piston 27 causes the main valve member 21 to be released from the valve seat 22 so that the valve hole 23 is opened. Accordingly, high-pressure steam passing inside the inner cylinder 11 flows to the outlet 7 through the valve hole 23, and thus, the pressure of the outlet 7 increases to a predetermined value.

When the pressure of the outlet 7 increases to a predetermined value, the pressure of the lower surface chamber 36 also increases, and a lifting force of the diaphragm 33 under the pressure of the lower surface chamber 36 and the biasing force of the spring 34 are balanced so that the pilot valve member 30 is thereby displaced upward. Accordingly, the communication path 31 and the communication path 32 are shut-off, and high-pressure fluid in the piston chamber 28 flows to the outlet 7 through a release hole (not shown). Thus, the pressure of the piston chamber 28 decreases, and with upward displacement of the piston 27, the main valve member 21 is displaced upward and seated on the valve seat 22 by a biasing force of the spring 24. Accordingly, the valve hole 23 is closed. In this manner, the pressure reducing mechanism 20 keeps the pressure at the outlet 7 at a constant value.

The drainage mechanism 40 discharges drain separated from steam by the separation mechanism 10 toward outside of the housing 1. That is, the drainage mechanism 40 discharges only drain in steam and drain that have flowed from the inlet 6.

Figure 2:
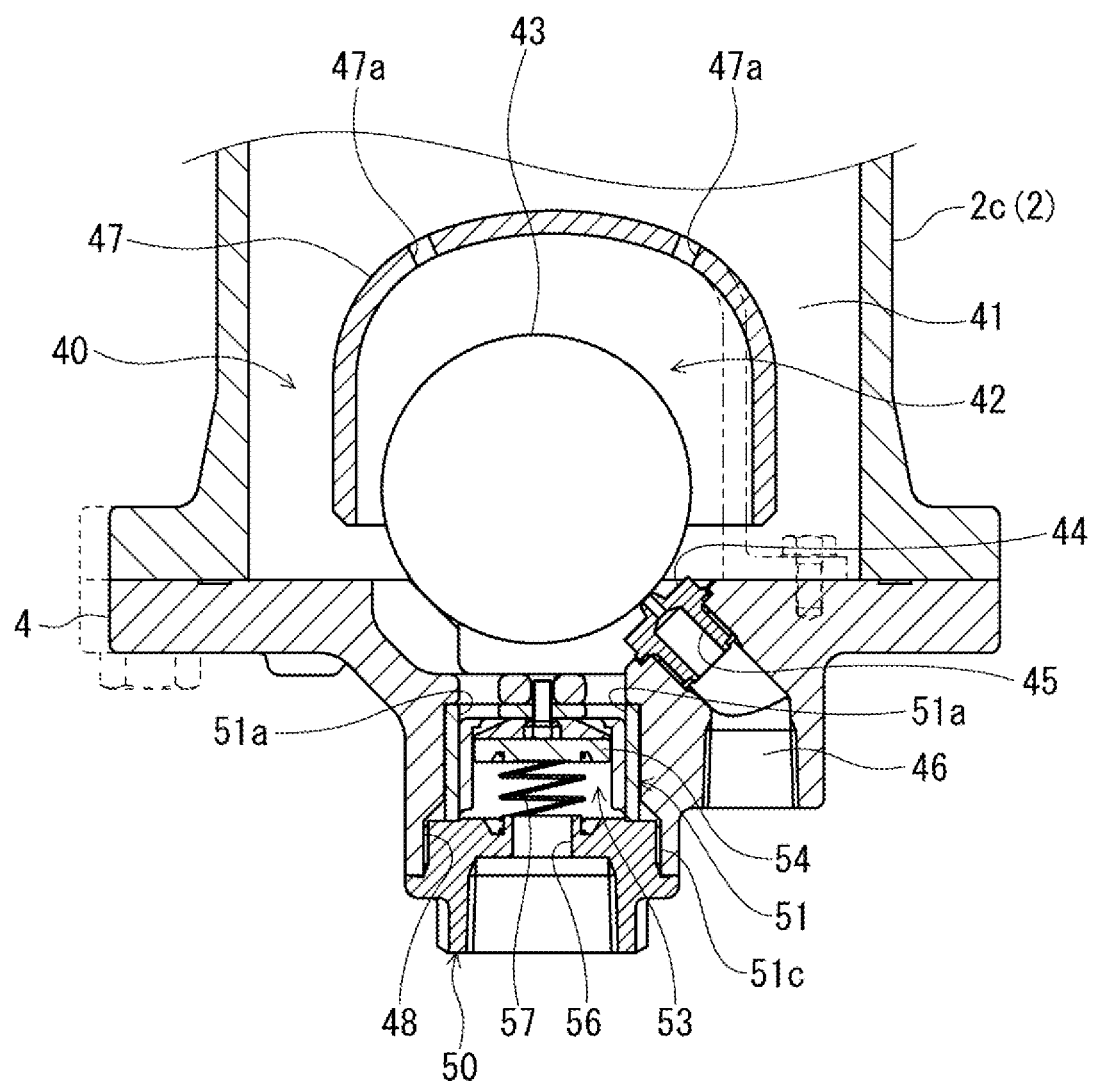
FIG. 2 is an enlarged cross-sectional view illustrating a main portion of the pressure reducing valve according to the first embodiment.

As also illustrated in FIG. 2, the drainage mechanism 40 includes a first reservoir 41, a first valve mechanism 42, a discharge channel 46, and a discharge valve unit 50.

The first reservoir 41 is disposed below the inlet 6 and the separation mechanism 10, and formed across the lower part 2c and the bottom lid 4. The first reservoir 41 communicates with the inlet 6 through the ring-shaped space 13 of the separation mechanism 10. The first reservoir 41 stores drain separated by the separation mechanism 10 and having flowed along the inner wall surface of the lower part 2c. That is, the first reservoir 41 stores drain that has flowed from the inlet 6.

The first valve mechanism 42 is a valve mechanism that causes drain to flow out of the first reservoir 41 to the discharge channel 46 and prevents steam from flowing out of the first reservoir 41 to the discharge channel 46. The discharge channel 46 is formed in the bottom lid 4. The discharge channel 46 has an upstream end connected to a lower portion of the first reservoir 41 and a downstream end open to the outside of the housing 1 (the air).

The first valve mechanism 42 is provided in the first reservoir 41 and includes a first valve member 43 and a first valve seat 44.

The first valve member 43 is a spherical hollow float and accommodated in the first reservoir 41 in a free state. The first valve seat 44 is provided at a portion of the first reservoir 41 connected to the discharge channel 46. The first valve seat 44 has a first discharge hole 45 for drain as a valve hole. That is, the first discharge hole 45 is provided in the first reservoir 41 and causes the first reservoir 41 and the discharge channel 46 to communicate with each other. The upstream end of the first discharge hole 45 constitutes an orifice.

In the first valve mechanism 42, the first valve member 43 floats up and down in accordance with a storage level of drain (drain level) in the first reservoir 41 so that the first discharge hole 45 is opened and closed. Specifically, when the amount of drain in the first reservoir 41 increases, the first valve member 43 floats up to be released from the first valve seat 44 so that the first discharge hole 45 is opened. On the other hand, when the amount of drain in the first reservoir 41 decreases, the first valve member 43 is lowered to be seated on the first valve seat 44 so that the first discharge hole 45 is closed.

More specifically, during operation of the steam system, the pressure at the upstream side of the first discharge hole 45 increases to a predetermined value (also referred to as a pressure Pa during operation). That is, a pressure difference (difference between a pressure of the first reservoir 41 as an upstream side and a pressure of the discharge channel 46 as a downstream side, i.e., atmospheric pressure) occurs across the upstream side and the downstream side of the first discharge hole 45. On the other hand, at the start of operation (operation start time), since the pressure at the upstream side of the first discharge hole 45 does not increase immediately, and thus, the pressure at the upstream side of the first discharge hole 45 is at a pressure Pb (hereinafter also referred to as a pressure Pb at operation start) lower than the pressure Pa during operation. That is, the pressure difference in the first discharge hole 45 at operation start is smaller than that during operation.

The pressure at the upstream side of the first discharge hole 45 (or a second discharge hole 56 described later) here is also a pressure at the inlet 6 and the first reservoir 41 (or a second reservoir 52 described later), and is also a pressure of drain in the first reservoir 41 and the second reservoir 52.

A force in the valve closing direction (hereinafter referred to as a valve closing force) is exerted on the first valve member 43 under the pressure Pa during operation and the pressure Pb at operation start. In other words, a pressure difference occurring in the first discharge hole 45 causes the valve closing force to be exerted on the first valve member 43. The first valve mechanism 42 is set such that a floating force of the first valve member 43 when the drain level of the first reservoir 41 is at a predetermined level is greater than a valve closing force of the first valve member 43 under the pressure Pa during operation. Thus, in the first valve mechanism 42, irrespective of whether during operation or at operation start, when the drain level of the first reservoir 41 reaches the predetermined level, the first valve member 43 floats up and the valve is opened.

In the first valve member 43, the valve closing force under the pressure Pa during operation is, of course, greater than the valve closing force under the pressure Pb at operation start. The floating force of the first valve member 43 described above is obtained by subtracting the self-weight from a buoyancy on the first valve member 43.

The first reservoir 41 is provided with a cap-shaped valve cover 47. The valve cover 47 is disposed above the first valve seat 44 and restricts a rising region of the first valve member 43. That is, the first valve member 43 floats up to contact the valve cover 47 so that the valve cover 47 thereby restricts rising of the first valve member 43 to a level higher than or equal to a predetermined level. The valve cover 47 includes an air discharge hole 47a through which a gas in the valve cover 47 flows out while drain is being accumulated in the first reservoir 41.

The discharge valve unit 50 is detachably attached to the bottom lid 4. Specifically, the bottom lid 4 has a through hole 48 allowing a bottom portion of the first reservoir 41 to communicate with the outside of the housing 1 (the air). The through hole 48 extends upward and downward. The discharge valve unit 50 is inserted in the through hole 48 from outside of the housing 1 and attached.

Figure 3:
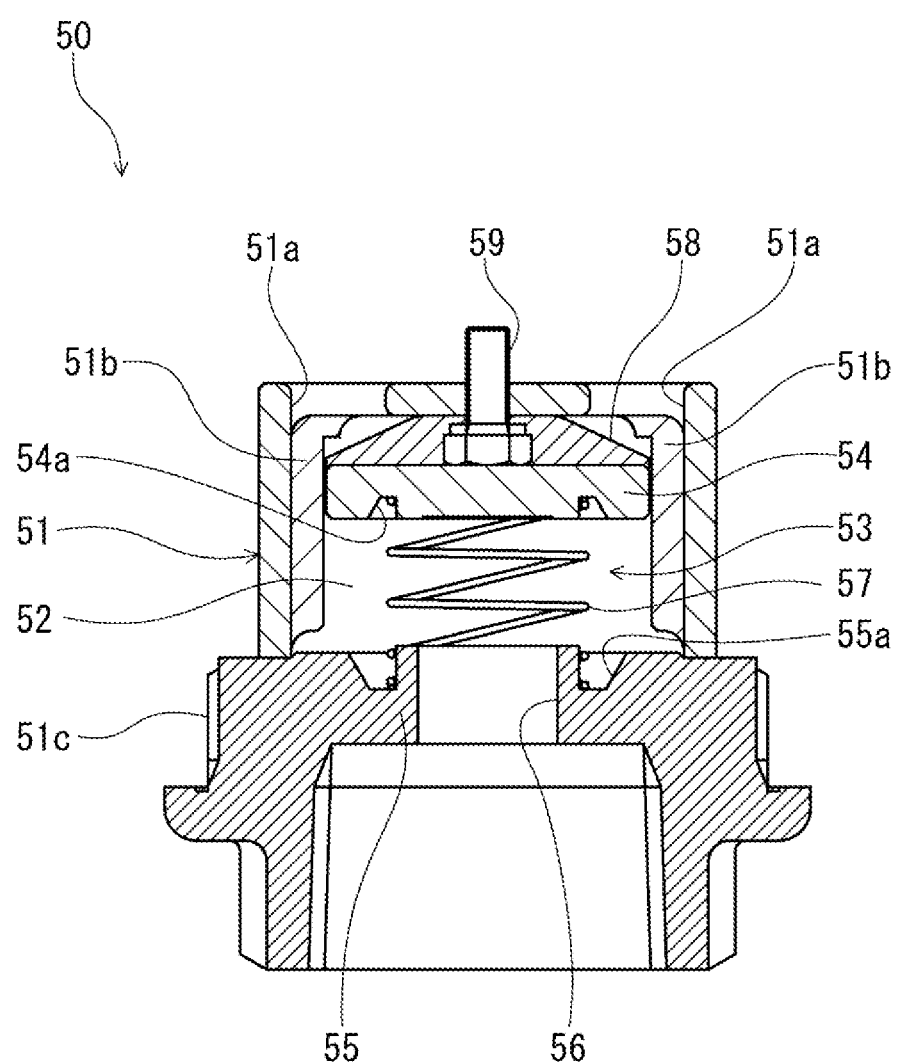
FIG. 3 is a cross-sectional view illustrating a schematic configuration of a discharge valve unit according to the first embodiment.

As also illustrated in FIG. 3, the discharge valve unit 50 includes a valve case 51 and a second valve mechanism 53.

The valve case 51 has a cylindrical shape extending upward and downward, and has one end (upper end) closed. The valve case 51 is detachably attached to the through hole 48 of the bottom lid 4, includes a second reservoir 52 for drain configured to communicate with the first reservoir 41 when being attached to (inserted in) the through hole 48.

More specifically, the inside of the valve case 51 is separated into upper and lower spaces (in the axial direction), and the upper space (at the closed end) constitutes the second reservoir 52. The upper wall (at the closed end) of the valve case 51 has a communication hole 51a for allowing the second reservoir 52 to communicate with the first reservoir 41. That is, the valve case 51 is attached to (inserted in) the through hole 48 of the bottom lid 4 as a lower portion of the first reservoir 41 so that the second reservoir 52 thereby communicates with the first reservoir 41 through the communication hole 51a. In this manner, the second reservoir 52 is disposed below the first reservoir 41.

The valve case 51 has an external thread portion 51c attached to the through hole 48 of the bottom lid 4 by screwing. The external thread portion 51c is formed on the outer peripheral surface of an intermediate portion of the valve case 51 in the top-bottom direction (axial direction). The external thread portion 51c is screwed to an internal screw portion (not shown) formed on the inner peripheral surface of the through hole 48 so that the valve case 51 is thereby attached to the through hole 48.

The second valve mechanism 53 causes drain to flow out of the housing 1 (to the air) directly from the second reservoir 52, and prevents outflow of steam from the second reservoir 52 to the outside of the housing 1. The second valve mechanism 53 is provided in the second reservoir 52, and includes a second valve member 54, a second valve seat 55, a spring 57, and a baffle 58.

The second valve member 54 corresponds to a valve member as claimed in the present application, and has a disc shape. The second valve member 54 is accommodated in the second reservoir 52 with the shaft center thereof extending in the top-bottom direction. The second valve member 54 freely moves upward and downward. The second valve member 54 is disposed above the second discharge hole 56 described later, and moves upward and downward to thereby open and close the second discharge hole 56.

The inner peripheral surface of the valve case 51 is provided with guides 51b. The guides 51b project radially inward from the inner peripheral surface and extend in the top-bottom direction. The plurality of guides 51b are arranged in the circumferential direction of the valve case 51. The second valve member 54 is provided at the inner side of the plurality of guides 51b, and moves upward and downward along the guides 51b.

The second valve seat 55 is provided at the bottom of the second reservoir 52, that is, on the wall that partitions the valve case 51 into an upper space and a lower space. The second valve seat 55 has the second discharge hole 56 for drain that is a valve hole. That is, the second discharge hole 56 is provided at the bottom of the second reservoir 52, and is open in the top-bottom direction. The second discharge hole 56 allows the second reservoir 52 to communicate with the outside of the housing 1 (the air).

The upstream end of the second discharge hole 56 constitutes an orifice. The second discharge hole 56 has an opening diameter larger than that of the first discharge hole 45. Here, in the drainage mechanism 40, the opening diameter refers to an opening diameter (i.e., the diameter of the orifice) at the upstream end of each of the discharge holes 45 and 56.

The spring 57 biases the second valve member 54 in a valve opening direction, and is constituted by a coil spring. The spring 57 is disposed below the second valve member 54 in the second reservoir 52, and biases the second valve member 54 upward. The spring 57 has one end connected to the lower surface of the second valve member 54 to support the second valve member 54. More specifically, one end of the spring 57 is fitted in and connected to a ring-shaped recess 54a formed on the lower surface of the second valve member 54. The other end of the spring 57 is fitted in and connected to a ring-shaped recess 55a formed around the second discharge hole 56 in the upstream face of the second valve seat 55.

The baffle 58 prevents drain flowing down from the first reservoir 41 to the second reservoir 52 through the communication hole 51a from hitting the upper surface of the second valve member 54. The baffle 58 is disposed above the second valve member 54 in the second reservoir 52.

The baffle 58 has a substantially disc shape, and is oriented with the shaft center thereof extending in the top-bottom direction. The baffle 58 has a diameter substantially equal to that of the second valve member 54, and is coaxial with the second valve member 54. That is, the baffle 58 covers the upper surface of the second valve member 54. The second valve member 54 is pushed against the baffle 58 by a biasing force of the spring 57 in opening the valve.

The position of the baffle 58 in the top-bottom direction is changeable. Specifically, the baffle 58 is fixed to an upper wall of the valve case 51 with a screw 59. The position of the baffle 58 in the top-bottom direction is changed by changing the screwing length of the screw 59 to the upper wall. That is, the baffle 58 also serves as a restriction member for restricting the upper limit position of the second valve member 54 in opening the valve.

The second valve mechanism 53 is configured such that the second valve member 54 is displaced (lifted and lowered) in accordance with the pressure of the second reservoir 52 to open and close the second discharge hole 56.

Specifically, in the second valve mechanism 53, when the pressure of the second reservoir 52 decreases to a predetermined vale (pressure Pb at operation start), the second valve member 54 floats up by a biasing force of the spring 57 and is released from the second valve seat 55 so that the second discharge hole 56 is opened. In the second valve mechanism 53, when the pressure of the second reservoir 52 rises to a predetermined value (pressure Pa during operation), the second valve member 54 floats down under the pressure against the biasing force of the spring 57 to be seated on the second valve seat 55. Accordingly, the second discharge hole 56 is closed.

More specifically, during operation of the steam system, in a manner similar to the first discharge hole 45, the pressure at the upstream side of the second discharge hole 56 also rises to the pressure Pa during operation. That is, a pressure difference (difference between the pressure of the second reservoir 52 as the upstream end and the atmospheric pressure outside the housing 1 as the downstream side) occurs across the upstream and downstream sides of the second discharge hole 56. On the other hand, in operation start (operation start time), in a manner similar to the first discharge hole 45, the pressure at the upstream side of the second discharge hole 56 is at the pressure Pb at operation start lower than the pressure Pa during operation. That is, the pressure difference in the second discharge hole 56 at operation start is smaller than that during operation.

In a manner similar to the first valve member 43, a valve closing force is exerted on the second valve member 54 under the pressure Pa during operation and the pressure Pb at operation start. In other words, occurrence of the pressure difference in the second discharge hole 56 causes a valve closing force to be exerted on the second valve member 54. In the second valve member 54, the valve closing force under the pressure Pa during operation is, of course, greater than the valve closing force under the pressure Pb at operation start.

A biasing force of the spring 57 is set to be larger than a valve closing force of the second valve member 54 under the pressure Pb at operation start. The biasing force of the spring 57 is set to be lower than the valve closing force of the second valve member 54 under the pressure Pa during operation. Thus, the pressure of the second reservoir 52 decreases to the pressure Pb at operation start at operation start so that the valve of the second valve mechanism 53 is opened, and during subsequent operation, the pressure of the second reservoir 52 increases to the pressure Pa during operation so that the valve of the second valve mechanism 53 is closed.

Operation of Drainage Mechanism

It will be described how the drainage mechanism 40 described above operates at the operation start (operation start time) of the steam system. At the operation start, the pressures and temperatures of the upstream sides of the first discharge hole 45 and the second discharge hole 56 are low, and low-temperature and low-pressure drain remains in, for example, pipes of the steam system. That is, the pressure of each of the first reservoir 41 and the second reservoir 52 has decreased to the pressure Pb at operation start.

In the first valve mechanism 42, in a case where no drain remains in the first reservoir 41 or the drain level is lower than a predetermined level, the first valve member 43 is seated on the first valve seat 44 and the first discharge hole 45 is closed (see FIG. 2). In the second valve mechanism 53, since the biasing force of the spring 57 is greater than the valve closing force of the second valve member 54 under the pressure Pb at operation start, the second valve member 54 is released from the second valve seat 55 and the second discharge hole 56 is opened (see FIGS. 2 and 3). That is, the first valve mechanism 42 is closed, and the second valve mechanism 53 is open.

In this manner, at the operation start, the second valve mechanism 53 is open, and drain remaining in the steam system flows into the pressure reducing valve 100. In the pressure reducing valve 100, drain that has flowed from the inlet 6 flows into the first reservoir 41 through the ring-shaped space 13 of the separation mechanism 10. Thereafter, the drain flows into the second reservoir 52 from the first reservoir 41 through the communication hole 51a, and flows (is discharged) to the outside of the housing 1 through the second discharge hole 56. Since the opening diameter of the second discharge hole 56 is larger than that of the first discharge hole 45, a large amount of drain is discharged quickly.

In the manner described above, the drainage mechanism 40 of the pressure reducing valve 100 discharges low-temperature drain remaining in the steam system quickly at the operation start.

In addition, while drain flows down from the first reservoir 41 into the second reservoir 52, the baffle 58 can prevent drain from hitting the upper surface of the second valve member 54. Thus, it is possible to prevent or reduce a rattle of the second valve member 54 that can occur by hitting of drain on the second valve member 54. In addition, as illustrated in FIG. 3, since the second valve member 54 is pushed against the baffle 58 by a biasing force of the spring 57, a rattle of the second valve member 54 caused by hitting of drain can also be prevented or reduced.

It will now be described how the drainage mechanism 40 described above operates during operation of the steam system. During operation, the pressures and temperatures at the upstream sides of the first discharge hole 45 and the second discharge hole 56 are high, and high-temperature and high-pressure steam (including drain) flows into the pressure reducing valve 100. That is, the pressures of the first reservoir 41 and the second reservoir 52 increase to the pressure Pa during operation. From the steam that has flowed into the pressure reducing valve 100, drain is separated in the separation mechanism 10.

Figure 4:
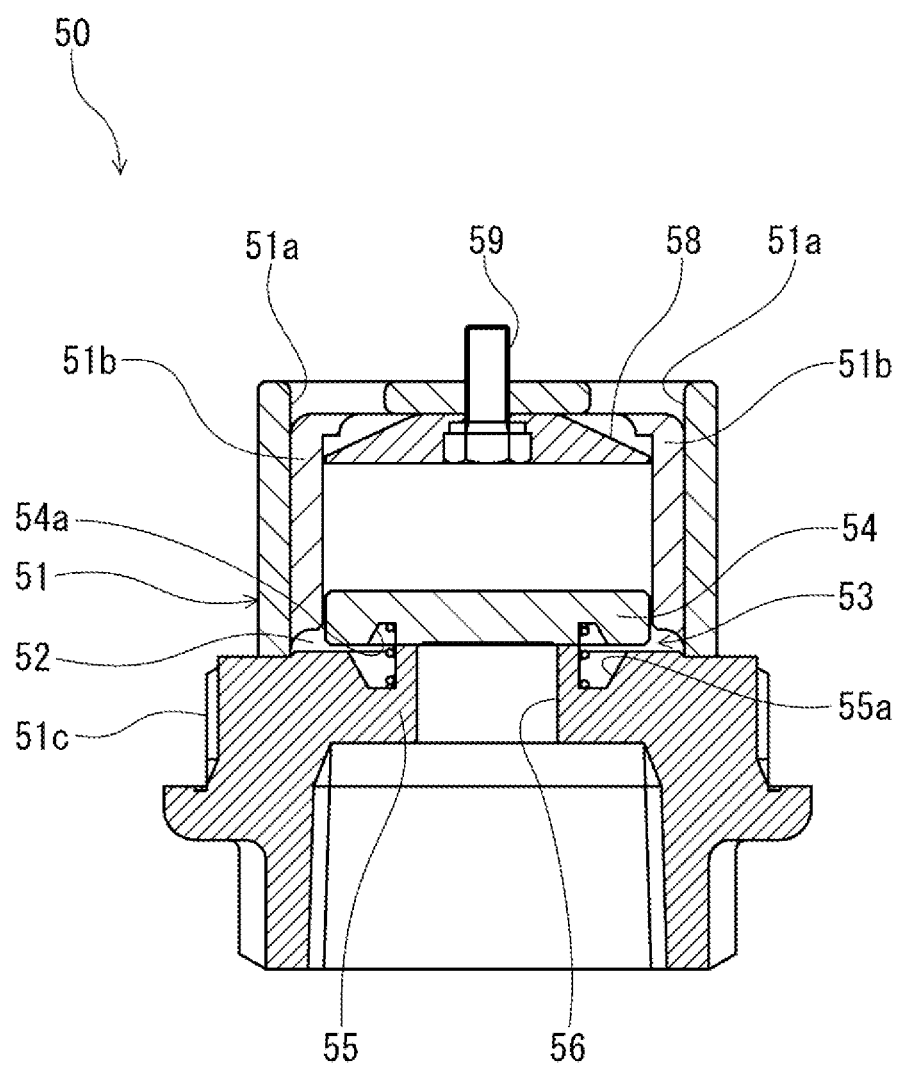
FIG. 4 illustrates the discharge valve unit according to the first embodiment and corresponds to FIG. 3.

In the second valve mechanism 53, since the biasing force of the spring 57 is smaller than the valve closing force of the second valve member 54 under the pressure Pa during operation, the second valve member 54 is seated on the second valve seat 55 under the pressure Pa during operation so that the second discharge hole 56 is closed (see FIG. 4). That is, the second valve mechanism 53 is closed. Accordingly, drain separated in the separation mechanism 10 flows from the first reservoir 41 into the second reservoir 52 and is gradually accumulated in the second reservoir 52.

When the second reservoir 52 is filled with drain, drain starts being accumulated in the first reservoir 41. In the first valve mechanism 42, when the drain level of the first reservoir 41 increases to a predetermined level, the first valve member 43 floats up to be released from the first valve seat 44, and the first discharge hole 45 is opened. That is, the first valve mechanism 42 is opened. Then, drain in the first reservoir 41 flows into the discharge channel 46 through the first valve mechanism 42, and is discharged to the outside of the housing 1 (into the air).

On the other hand, in a case where part of steam separated from drain by the separation mechanism 10 flows into the first reservoir 41, drain in the first reservoir 41 flows out of the first valve mechanism 42 to decrease in amount, and then, the first valve member 43 is seated on the first valve seat 44. In this manner, the first valve mechanism 42 is closed, and an outflow of steam from the first discharge hole 45 is prevented.

In this manner, during operation, the drainage mechanism 40 of the pressure reducing valve 100 discharges drain separated in the separation mechanism 10 to the outside of the housing 1, and prevents an outflow of steam to the outside of the housing 1. In addition, during operation, the second valve mechanism 53 remain closed, and the second reservoir 52 is filled with drain. On the other hand, the pressure of steam separated from drain by the separation mechanism 10 is reduced to a predetermined pressure by the pressure reducing mechanism 20, and the resulting steam is supplied from the outlet 7 to a downstream place of use.

When operation of the steam system stops, the pressures and temperatures at the upstream sides of the first discharge hole 45 and the second discharge hole 56 gradually decrease.

Then, when the pressure of the second reservoir 52 decreases to the pressure Pb at operation start, the second valve member 54 floats up by the biasing force of the spring 57 to be released from the second valve seat 55. In this manner, the second valve mechanism 53 is opened so that drain accumulated in the second reservoir 52 is discharged to the outside of the housing 1 through the second discharge hole 56. The second valve mechanism 53 is maintained in the open state until the start of next operation.

As described above, the discharge valve unit 50 according to this embodiment is configured to be attached to the fluid device. The fluid device includes the housing 1 having the inlet 6 and the first reservoir 41 of drain that has flowed from the inlet 6, and includes the first valve mechanism 42 including the first discharge hole 45 for drain disposed in the first reservoir 41 and the first valve member 43 (float) accommodated in the first reservoir 41 and configured to open and close the first discharge hole 45.

The discharge valve unit 50 includes the valve case 51 and the second valve mechanism 53. The valve case 51 is configured to be detachably attached to the housing 1, and includes the second reservoir 52 for drain configured to communicate with the first reservoir 41 when the valve case 51 is attached to the housing 1. The second valve mechanism 53 is disposed in the second reservoir 52, and includes the second discharge hole 56 for drain having a larger opening diameter than that of the first discharge hole 45 and the second valve member 54 (valve member) accommodated in the second reservoir 52 and configured to open and close the second discharge hole 56. The second valve mechanism 53 includes the spring 57 configured to bias the second valve member 54 in the valve opening direction. When the pressure of the second reservoir 52 increases to a predetermined value, the second valve member 54 closes the second discharge hole 56 against a biasing force of the spring 57.

With this configuration, it is possible to provide the discharge valve unit 50 including the second discharge hole 56 for drain configured to be reliably opened at the operation start and closed during subsequent operation, and the pressure reducing valve 100 (fluid device). Thus, at the operation start, a large amount of low-temperature drain remaining in the steam system can be discharged quickly. As a result, water hammer that can be caused by a mixture of low-temperature drain with steam can be avoided.

In the discharge valve unit 50 according to this embodiment, the valve case 51 is attached to a lower portion of the first reservoir 41 in the housing 1, and an upper portion of the valve case 51 has the communication hole 51a configured to allow the second reservoir 52 to communicate with the first reservoir 41.

With this configuration, since the second reservoir 52 is disposed below the first reservoir 41, the water head of drain in the first reservoir 41 is added to drain in the second reservoir 52. Thus, at the operation start, drain discharge capacity of the second valve mechanism 53 is enhanced.

In the discharge valve unit 50 according to this embodiment, the second discharge hole 56 is open in the top-bottom direction at the bottom of the second reservoir 52. The second valve member 54 has a disc shape, and disposed above the second discharge hole 56. The spring 57 is disposed below the second valve member 54 and biases the second valve member 54 upward.

With this configuration, since the second discharge hole 56 is provided at the bottom of the second reservoir 52, the water head of drain in the second reservoir 52 can be obtained as much as possible so that drain discharge capacity of the second valve mechanism 53 is thereby further enhanced. In addition, since the second valve member 54 is a so-called disc-shaped valve member, installation space for the second valve mechanism 53 can be reduced, as compared to, for example, a spherical float.

In the discharge valve unit 50 according to this embodiment, the spring 57 has one end connected to the lower surface of the second valve member 54 to thereby support the second valve member 54. The second valve mechanism 53 includes the baffle 58 disposed above the second valve member 54 in the second reservoir 52. The baffle 58 prevents drain flowing down to the second reservoir 52 from the first reservoir 41 through the communication hole 51a from hitting the upper surface of the second valve member 54.

With this configuration, in the open valve state of the second valve mechanism 53, it is possible to prevent a rattle of the second valve member 54 that can occur when drain flowing down from the first reservoir 41 hits the upper surface of the second valve member 54. When the second valve member 54 rattles irregularly, a flow of drain toward the second discharge hole 56 is disturbed and, consequently, drain discharge efficiency might be impaired. However, this embodiment can prevent this problem. In particular, although occurrence of a rattle of the second valve member 54 might be conspicuous because the second valve member 54 is supported by the spring 57 connected to the lower surface thereof, this rattle can be effectively prevented or reduced.

In addition, in the discharge valve unit 50 according to this embodiment, the second valve member 54 is pushed against the baffle 58 by the biasing force of the spring 57. This can also prevent or reduce a rattle of the second valve member 54 caused by hitting by drain.

In the discharge valve unit 50 according to this embodiment, the position of the baffle 58 in the top-bottom direction is changeable. This configuration can adjust a biasing force of the spring 57 in accordance with a change of operating conditions of the steam system.

That is, in a case where the pressure Pa during operation or the pressure Pb at operation start is changed, the biasing force of the spring 57 can be adjusted such that the second valve mechanism 53 is appropriately opened or closed under the pressure Pa or Pb after the change. For example, to reduce the biasing force of the spring 57, the position of the baffle 58 is shifted upward, whereas to increase the biasing force of the spring 57, the position of the baffle 58 is shifted downward.

In the discharge valve unit 50 according to this embodiment, the valve case 51 includes the external thread portion 51c configured to be attached to the housing 1 by screwing. With this configuration, the discharge valve unit 50 can be easily attached and detached to/from the housing 1 of the pressure reducing valve 100 (fluid device).

In a case where the function of the discharge valve unit 50 is unnecessary for the pressure reducing valve 100 (fluid device), a plug is screwed instead of the discharge valve unit 50 so that the pressure reducing valve 100 can still be used.

Second Embodiment

Figure 5:
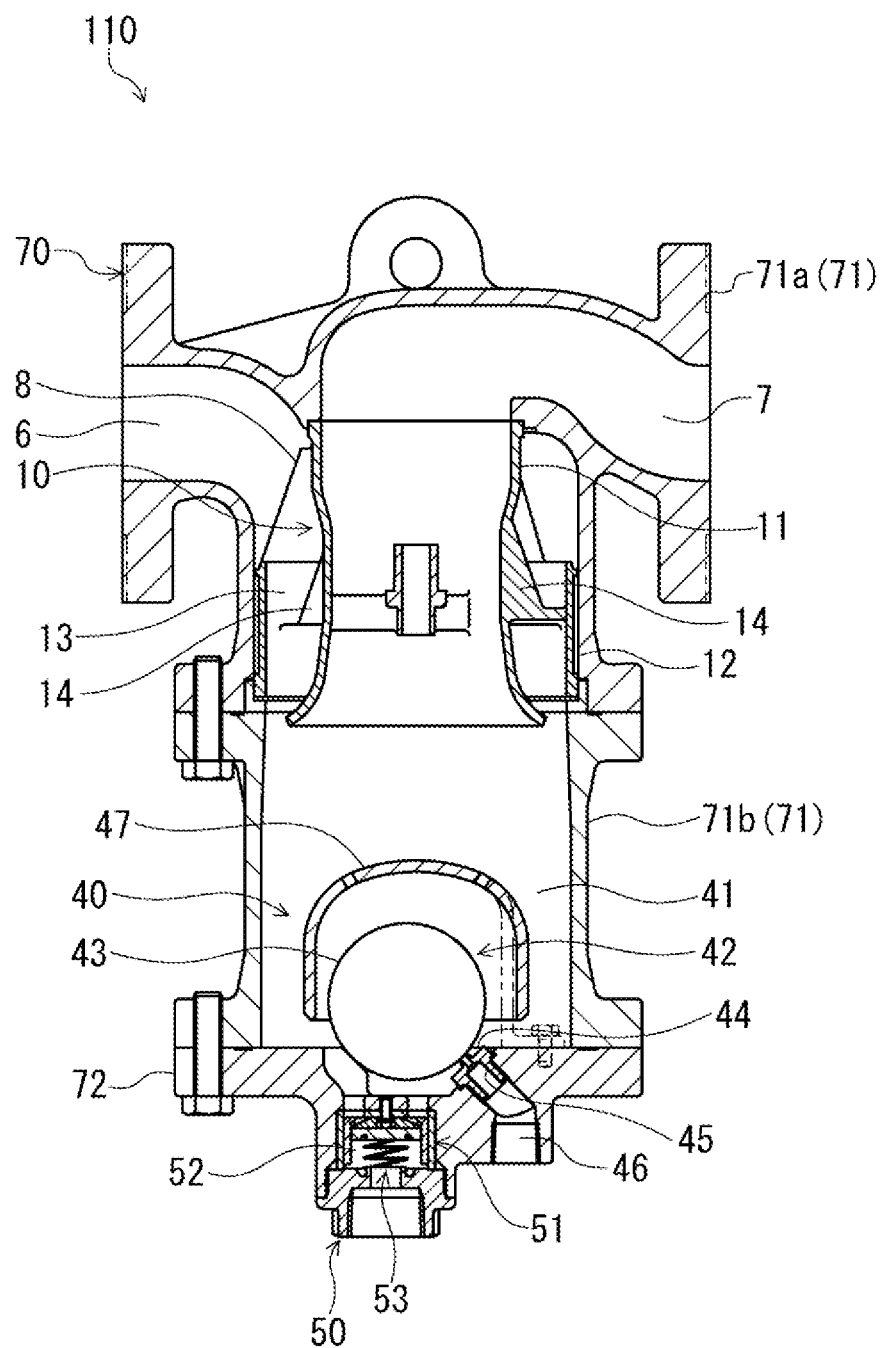
FIG. 5 is a cross-sectional view illustrating a schematic configuration of a gas-liquid separator according to a second embodiment.

A second embodiment of the present application will be described with reference to FIG. 5. This embodiment is directed to a gas-liquid separator 110 (fluid device) to which the discharge valve unit 50 of the first embodiment is attached. The gas-liquid separator 110 according to this embodiment has substantially the same configuration as a configuration in which the pressure reducing mechanism 20 is omitted in the pressure reducing valve 100 of the first embodiment. In the second embodiment, aspects different from those of the first embodiment will be described.

The gas-liquid separator 110 is provided in, for example, a steam system, separates drain included in inflow steam, and supplies the separated steam to a downstream side. The gas-liquid separator 110 incorporates a drainage mechanism 40 configured to discharge the separated drain. That is, the gas-liquid separator 110 is a gas-liquid separator having a drain trap function. The gas-liquid separator 110 is equipped with the discharge valve unit 50 constituting a part of the drainage mechanism 40.

The gas-liquid separator 110 includes a housing 70 having a fluid channel, and a separation mechanism 10 and the drainage mechanism 40 that are incorporated in the housing 70. The configurations and functions of the separation mechanism 10 and the drainage mechanism 40 are similar to those of the first embodiment.

The housing 70 includes a body 71 and a bottom lid 72 attached to the body 71. The body 2 is constituted by an upper part 71*a* and a lower part 71*b* that are coupled to each other in the top-bottom direction. In a manner similar to the first embodiment, the housing 70 has a steam inlet 6 and a steam outlet 7. Each of the inlet 6 and the outlet 7 is a part of the channel described above and provided in the upper part 71*a*.

In a manner similar to the first embodiment, the separation mechanism 10 and the drainage mechanism 40 are sequentially disposed in the housing 70 in this order from above. The separation mechanism 10 is substantially disposed in the upper part 71*a*, and communicates with the inlet 6. The drainage mechanism 40 is disposed across the lower part 71*b* and the bottom lid 72, and communicates with the inlet 6 through the separation mechanism 10.

That is, the housing 70 includes a channel through which steam that has flowed from the inlet 6 flows to the outlet 7 via the separation mechanism 10, and a channel through which drain that has flowed in the channel from the inlet 6 together with steam flows to the drainage mechanism 40 via the separation mechanism 10.

In the thus-configured gas-liquid separator 110 of this embodiment have advantages similar to those of the first embodiment.

The technique disclosed in the present application may have the following configurations in the embodiments.

For example, in the discharge valve unit 50 of the embodiments, the spring 57 is disposed below the second valve member 54, but may be disposed above the second valve member. In this case, the spring is configured as a tension spring that biases the second valve member in the valve opening direction (upward).

In the discharge valve unit 50 of the embodiments, a spherical float may be used as the second valve member 54.

In the discharge valve unit 50 according to the embodiments, the baffle 58 may be omitted, or the valve case may be fixed to the housing with a screw.

As an example of the fluid device, the pressure reducing valve 100 and the gas-liquid separator 110 have been described, but the present application is also applicable to other fluid devices as long as a drainage mechanism is provided.

The technique disclosed here is useful for a discharge valve unit and a fluid device equipped with the discharge valve unit.

What is claimed is:

1. A discharge valve unit configured to be attached to a fluid device, the fluid device including a housing including an inlet and a first reservoir for liquid that has flowed from the inlet, the fluid device including a first valve mechanism including a first discharge hole for liquid provided in the first reservoir and a float accommodated in the first reservoir and configured to open and close the first discharge hole, the discharge valve unit comprising:
   a valve case configured to be detachably attached to the housing, the valve case including a second reservoir for liquid configured to communicate with the first reservoir not through the first discharge hole but through a communication hole when the valve case is attached to the housing; and
   a second valve mechanism disposed in the second reservoir, the second valve mechanism including a second discharge hole for liquid having an opening diameter larger than an opening diameter of the first discharge hole, and including a valve member accommodated in the second reservoir and configured to open and close the second discharge hole, wherein
   the second valve mechanism includes a spring configured to bias the valve member in a valve opening direction, and when a pressure of the second reservoir increases to a predetermined value, the valve member closes the second discharge hole under the pressure against a biasing force of the spring;
   the valve case is attached to a lower portion of the first reservoir in the housing, and an upper portion of the valve case has the communication hole configured to allow the second reservoir to communicate with the first reservoir;
   the second discharge hole is open in a top-bottom direction at a bottom of the second reservoir;
   the valve member has a disc shape and is disposed above the second discharge hole; and
   the spring is disposed below the valve member and biases the valve member upward.

2. The discharge valve unit according to claim 1, wherein the spring has one end connected to a lower surface of the valve member and supports the valve member, and
   the second valve mechanism includes a baffle disposed above the valve member in the second reservoir, the baffle being configured to prevent liquid flowing down to the second reservoir from the first reservoir through the communication hole from hitting an upper surface of the valve member.

3. The discharge valve unit according to claim 2, wherein the valve member is pushed against the baffle by a biasing force of the spring.

4. The discharge valve unit according to claim 3, wherein a position of the baffle in the top-bottom direction is changeable.

5. The discharge valve unit according to claim 1, wherein the valve case includes an external thread portion configured to be attached to the housing by screwing.

6. A fluid device comprising
   the discharge valve unit according to claim 1 configured to be attached to the housing.

7. The fluid device according to claim 6, further comprising
   a separation mechanism disposed above the first reservoir in the housing and configured to separate liquid included in a gas that has flowed from the inlet, wherein
   the housing has an outlet from which a gas separated from liquid by the separation mechanism flows out, and
   the first reservoir stores liquid separated by the separation mechanism.

8. The fluid device according to claim 6, further comprising:
- a separation mechanism disposed above the first reservoir in the housing and configured to separate liquid included in a gas that has flowed from the inlet; and
- a pressure reducing mechanism disposed in the housing and configured to reduce a pressure of a gas separated from liquid by the separation mechanism and hold the reduced pressure at a predetermined pressure, wherein the housing has an outlet from which a gas whose pressure has been reduced by the pressure reducing mechanism flows out, and the first reservoir stores liquid separated by the separation mechanism.

\* \* \* \* \*